Dec. 22, 1942.   D. B. HYDE   2,306,312
BIRD FEEDING DEVICE
Filed April 3, 1942

Inventor:
Donald B. Hyde,
by Thomson & Thomson
Attorneys

Patented Dec. 22, 1942

2,306,312

UNITED STATES PATENT OFFICE 2,306,312

BIRD FEEDING DEVICE

Donald B. Hyde, Newton, Mass.

Application April 3, 1942, Serial No. 437,463

5 Claims. (Cl. 119—51)

This invention relates to improvements in a bird feeding device.

It is an object of my invention to provide a bird feeding device which may be readily filled with food for the birds by having openings formed therein into which may be inserted removable cups containing the bird food.

It is further an object of my invention to provide a bird feeder having means to receive removable cups containing bird food, the feeder being adapted to be suspended in a vertical position, the sides thereof being provided with means for the birds to cling or perch on the feeder.

It is further an object of my invention to provide a bird feeder composed of a relatively long wood block into the sides of which holes are bored to receive removable cups containing bird food, and to provide means for permitting birds to cling or perch on the feeder by milling the vertical surfaces of the feeder, by forming perching grooves adjacent the cups of food, or by providing laterally extending perches adjacent the cups of food.

Further objects and advantages of my improvements will be more readily apparent from the following description of preferred embodiments thereof as illustrated in the attached drawing, in which.

Figure 1:
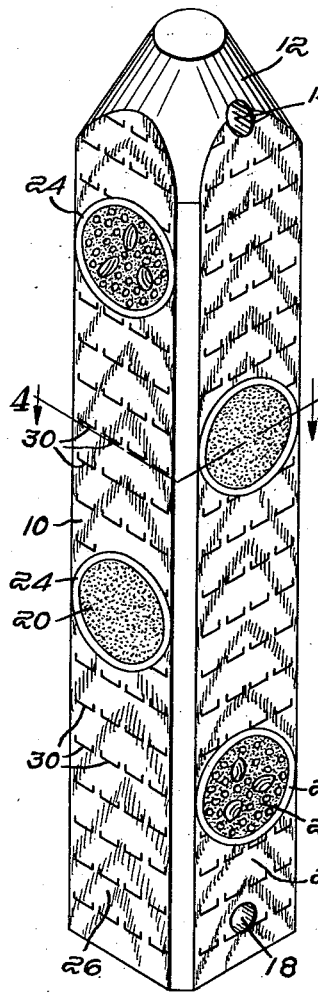
Fig. 1 is a perspective view of one embodiment of the improved form of bird feeder.
Figure 2:
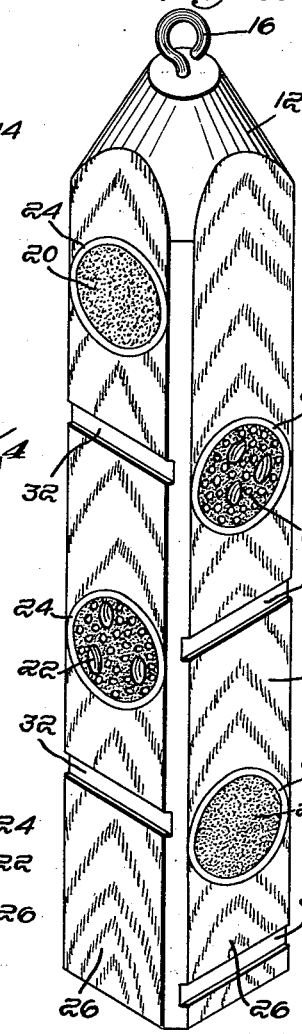
Fig. 2 is a similar perspective view of a modified form of the feeder.
Figure 3:
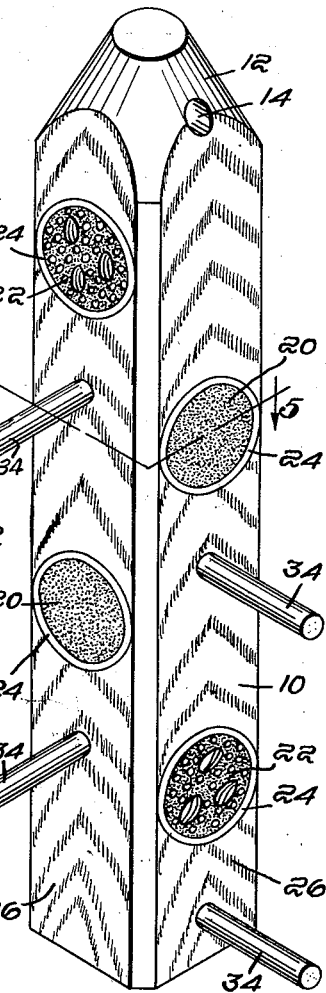
Fig. 3 is a perspective view of a further modification.
Figures 4, 5:
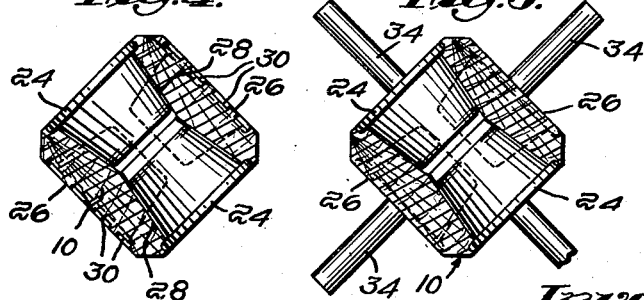
Fig. 4 is a sectional view taken on the plane indicated 4—4 in Fig. 1.
Fig. 5 is a sectional view taken on the plane indicated 5—5 in Fig. 3.

The bird feeder as disclosed in Fig. 1 comprises a solid block of wood 10 which is preferably substantially square in cross-section. The upper end of the wood block is preferably given a conical shape as indicated at 12. The block is adapted to be suspended to hang vertically and for this purpose a horizontal opening 14 may be drilled through the upper end of the block as shown in Figs. 1 and 3, or a hook 16 may be screwed into the upper end of the block as shown in Fig. 2 in order to receive a wire, rope or other means to suspend the feeder. In order to hold the block more firmly in position, a horizontal opening 18 may be drilled through the bottom end of the block as shown in Fig. 1, or, as in Fig. 2, a hook similar to the hook 16 may be fixed to the lower end of the block to which a wire may be attached so that the feeder is tied at both ends.

An important improvement in the feeder herein disclosed resides in the provision of novel means for attaching the food to the feeder in a simple, convenient and attractive manner. The food 20 and 22 is packed and distributed in paper cups 24 and the bird feeders are provided with openings into which the cups 24, filled with the bird food, may be inserted. For example, in each of the four vertical sides 26 of the bird feeder conical openings 28 are formed to receive the cups 24. Preferably the holes 28 on opposite sides of the block are arranged to meet at the center so that there is a continuous opening through the block. When the holes are formed in this manner, it is relatively easy to clean out the openings when the feeder is being refilled with food. The holes 28 are staggered throughout the length of the wood block thereby providing openings to receive a number of the food cups without materially weakening the strength of the wood block. The paper cups 24 are shaped to closely fit the conical openings 28. The cups are pressed firmly into the holes so that they will not drop out, and preferably so that the tops of the cups are substantially flush with the vertical surfaces 26 of the wood block.

If the sides of the block were smooth, the birds could not use the food since they would be unable to cling or perch on the smooth vertical sides. Therefore, it is essential to provide some means for the birds to cling or perch on the feeder. The feeder may be finished in such a manner that only certain desired birds can use the feeder. For example, if it is desired that only the clinging birds such as the chickadees, nuthatches, woodpeckers and creepers use the feeder, the vertical surfaces 26 of the wood block are roughened and milled as indicated at 30 in Fig. 1. Similarly, the feeder shown in Fig. 2 may be formed with milled grooves 32 which are cut horizontally below each of the cups 24. If it is desired that any perching bird may use the feeder, perches may be provided as shown in Fig. 3 in which wood pegs 34 are fitted into drilled openings immediately below each of the food cups 24. These perches 34 are positioned to extend laterally outward from the vertical surfaces of the feeder.

The feeder is attractive to the birds since the food may be readily reached and there are no metal parts or other means which may injure the birds while they are using the feeder. Furthermore, the food is retained in such a manner that it is protected to some extent from the weather, and the feeder can be positioned out of the reach of other animals. After the food in the cups has been used up, it is a simple matter to remove the old cups and insert new cups which are supplied already filled with food.

I claim:

1. A bird feeder comprising a relatively long, wood block substantially square in cross-section adapted to be suspended in vertical position when in use, the vertical sides of the wood block having frusto-conical openings formed therein, replaceable frusto-conical cups adapted to fit in the openings, said replaceable cups being filled with bird food, the sides of said wood block being finished to permit birds to cling or perch thereon.

2. A bird feeder comprising a relatively long, wood block substantially square in cross-section adapted to be suspended in vertical position when in use, the sides of the block being provided with a series of frusto-conical openings that receive removable food cups, the sides of said block being milled and roughened to permit birds to cling thereon and reach the food in the cups.

3. A bird feeder comprising a relatively long, wood block substantially square in cross-section adapted to be suspended in vertical position when in use, the sides of the block being provided with a series of frusto-conical openings that receive removable food cups, the sides of the wood block being formed with milled grooves immediately below each of the food cups to permit the birds to cling thereto and reach the food in the cups.

4. A bird feeder comprising a relatively long, wood block substantially square in cross-section adapted to be suspended in vertical position when in use, the sides of the block being provided with a series of frusto-conical openings that receive removable food cups, the sides of the wood block being provided with perches for the birds so that they may perch thereon and reach the food in the cups.

5. A bird feeding device comprising a relatively long block of wood approximately square in cross-section, means to suspend the wood block in a vertical position, each of the vertical sides of said block having a plurality of spaced openings formed therein, paper cups closely fitted into said openings so that the cup lips are substantially flush with the surfaces of the block, said cups being filled with food for the birds, and means on the vertical sides of the wood block to permit birds to cling or perch thereon so that the birds may reach the food in the cups.

DONALD B. HYDE.